(12) United States Patent
Mallette et al.

(10) Patent No.: US 6,206,124 B1
(45) Date of Patent: Mar. 27, 2001

(54) ADJUSTABLE REAR SUSPENSION FOR A TRACKED VEHICLE

(75) Inventors: Bertrand Mallette, Rock Forest; Steve Langlais, Portneuf, both of (CA)

(73) Assignee: Bombardier Inc., Montreal (CA)

( * ) Notice: Subject to any disclaimer, the term of this patent is extended or adjusted under 35 U.S.C. 154(b) by 0 days.

(21) Appl. No.: 09/137,605

(22) Filed: Aug. 21, 1998

(51) Int. Cl.[7] .................................................. B62D 55/104
(52) U.S. Cl. ........................ 180/193; 180/9.52; 180/9.56; 305/127
(58) Field of Search .................................. 180/9.52, 9.54, 180/9.56, 9.58, 9.5, 9.25, 184, 190, 193; 305/120, 124, 127

(56) References Cited

U.S. PATENT DOCUMENTS

| | | |
|---|---|---|
| 3,727,709 | 4/1973 | Newman . |
| 3,773,126 | 11/1973 | Irvine . |
| 3,788,412 | 1/1974 | Vincent . |
| 3,879,092 | 4/1975 | Rose ........................................ 305/24 |
| 3,944,005 | 3/1976 | Tomita . |
| 3,966,181 | 6/1976 | Lessard ................................... 267/58 |
| 4,133,400 | 1/1979 | Shiraishi . |
| 4,222,453 | 9/1980 | Fixsen et al. ......................... 180/193 |
| 4,314,618 * | 2/1982 | Tamura ................................. 180/193 |
| 4,462,480 * | 7/1984 | Yasui et al. .......................... 180/193 |
| 4,518,056 | 5/1985 | Kobayashi ........................... 180/193 |
| 5,265,692 * | 11/1993 | Mallette ................................ 180/193 |
| 5,370,198 * | 12/1994 | Karpik .................................. 180/193 |
| 5,692,579 * | 12/1997 | Peppel et al. ........................ 180/190 |
| 5,730,242 * | 3/1998 | Furusawa ............................. 180/193 |
| 5,947,220 * | 9/1999 | Oka et al. ............................. 180/193 |

* cited by examiner

*Primary Examiner*—Brian L. Johnson
*Assistant Examiner*—F. Zeender
(74) *Attorney, Agent, or Firm*—Pillsbury Madison & Sutro LLP (57) ABSTRACT

An adjustable rear suspension system for a tracked vehicle comprises a slide frame for guiding a portion of the endless track, the slide frame having a pair of substantially parallel slide rails, the slide rails defining a longitudinal direction. The rear suspension system further comprises at least one spring-like member for urging the slide frame away from the chassis. A front suspension arm assembly has an upper end pivotally connected to the chassis and a lower end pivotally connected to the slide frame. A rear suspension arm assembly has ail upper arm pivotally connected to the chassis and a lower end connected to at least one block capable of limited displacement in the longitudinal direction between a front stopper and a rear stopper. The rear suspension system further includes a rocker arm having an upper end connected to at least one block and a lower end pivotally connected to the slide frame. This rear suspension system compensates for rearward weight transfer caused by rapid forward acceleration of the tracked vehicle.

16 Claims, 7 Drawing Sheets

ADJUSTABLE REAR SUSPENSION FOR A TRACKED VEHICLE

FIELD OF THE INVENTION

This invention relates to suspension systems for tracked vehicles, and, more specifically, to rear suspension systems for snowmobiles.

BACKGROUND OF THE INVENTION

The dynamic response of a rear suspension system to the multitude of loads imposed upon it during operation is undoubtedly one of the most critical factors in determining the overall performance and ride comfort of a tracked vehicle such as a snowmobile. A rear suspension system generally has to contend with three types of loads that are regularly exerted upon a tracked vehicle regardless of whether it is employed for racing or mere recreation. First and foremost in severity are the impact loads imposed upon the rear suspension as the vehicle traverses rough terrain and encounters bumps. Secondly, there are internal forces developed during rapid acceleration which cause a weight transfer from the front of the vehicle to the rear. This tends to lift the skis off the ground and thus hampers steering. Finally, there are centrifugal loads imposed on the vehicle when cornering at high speeds. The complex interaction of the forces developed in the rear suspension system especially during vigorous operation have compelled engineers to re-evaluate the simple, traditional spring-damper mechanisms used to absorb shocks and to design new optimal (i.e. weight and cost-efficient) mechanisms for absorbing and attenuating the complex combination of loads imposed upon a modern high-performance snowmobile. Besides the force, stress, strain and fatigue considerations, suspension engineers have had to contend with the additional constraint of space. In order to improve cornering performance, snowmobiles must maintain a low center of gravity. This means that the suspension must be as compact as possible when fully compressed.

The fundamental structure of the rear suspension of a tracked vehicle such as a snowmobile has remained essentially constant for many years now. The rear suspension supports the track, which is maintained tout around a pair of parallel rails, a multitude of idler wheels and at least one drive wheel or sprocket. A shock absorbing mechanism involving compressed springs, dampers, struts, shock rods or practically any combination thereof urges the slide frame and the chassis of the snowmobile apart. In static equilibrium, the force of the springs urging the slide frame and the chassis apart is equal and opposite to the weight supported above the suspension. In recent years, engineers have begun to produce advanced suspension systems wherein the damping, spring rate, and range of travel can be adjusted to limit internal weight transfer caused by track tension and to improve comfort, control and performance.

SUMMARY OF THE RELEVANT PRIOR ART

U.S. Pat. No. 5,265,692 (Mallette) discloses a snowmobile track suspension in which the slide frame is supported by rearwardly angled front and rear suspension arm assemblies of similar length, construction and orientation. The front suspension arm assembly is pivotally mounted to the chassis at its upper end and to the slide frame at its lower end. The rear suspension arm assembly is pivotally mounted to the chassis at its upper end and pivotally connected to a pivot mount that is itself longitudinally movable inside a slot at a rearward portion of the slide frame. When the snowmobile encounters a bump, the slide frame is pushed backward until the slidable pivot mount abuts the forward inside wall of the slot. This couples the otherwise independent front and rear suspension arm assemblies such that the slide frame remains substantially horizontally (i.e. parallel to the ground) as it rises over the bump. In this coupled arrangement, the suspension retains the kinematic properties of a parallelogram four-bar mechanism.

U.S. Pat. No. 5,370,198 (Karpik) discloses a long-travel suspension for tracked vehicles employing a mechanism similar to Mallette's for contending with uneven terrain and inertial weight transfer due to rapid acceleration. While Mallette's slide frame comprises a horizontal slot, Karpik's slide frame has a slot angled at approximately 45 degrees so that the slot and the corresponding slide block are oriented at roughly the same angle as the rear suspension arm. Karpik asserts that this configuration reduces friction and thus allows the coupling of the front and rear suspension arms to occur optimally.

Finally, U.S. Pat. No. 5,692,579 (Peppel et al.) discloses an adjustable snowmobile track suspension also having downwardly angled front and rear suspension arms. The front suspension arm is pivotally connected at its upper end to the chassis and at its lower end to the slide frame. The rear suspension arm is pivotally connected at its upper end to the chassis and at its lower end to a lower pivot arm which in turn is pivotally mounted to the slide frame. The lower pivot arm is restrained from forward rotation by a front adjuster block mounted to the slide frame. The lower pivot arm is also restrained from rearward rotation by a rear stop or rear adjuster block also mounted to the slide frame. Both the front and rear adjuster blocks are asymmetrical in that the bore through which the adjuster blocks are attached to the slide frame has been eccentrically drilled such that the distances from the center of the bore to each of the four sides are all different. Thus, the rider can adjust the maximum angle of rotation of the lower pivot arm by rotating both the front and rear adjuster blocks. In operation, when the suspension encounters a bump, the slide frame is driven backwards until the lower pivot arm contacts the rear surface of clue front adjuster block whereupon the front and rear suspension arms become coupled and the slide frame rises substantially horizontally (i.e. parallel to the around). During rapid acceleration, the lower pivot arm collides with the front face of the rear adjuster block. Peppel et al. states that its suspension design permits the front portion of the slide frame to rise substantially independently of the rear portion of the slide frame. During this independent upward movement of the front portion of the slide frame, the lower pivot arm rotates from its rearward position (contacting the rear adjuster block) until it contacts the front adjuster block. Once the lower pivot arm has contacted the front adjuster block, the front suspension arm becomes coupled to the rear suspension arm and further independent motion of the front portion of the slide frame is prevented. The range of uncoupled movement (and hence the amount of front end inclination) can be varied by rotating the front and rear adjuster blocks.

However, certain drawbacks are evident from the Peppel et al. design. These drawbacks result from the direct mounting of the adjuster blocks to the slide frame. Firstly, since the adjuster blocks are mounted on the inside of the slide frame in close proximity to the rear suspension arm, it is awkward to rotate the adjuster blocks or to remove them for maintenance and cleaning. Secondly, the adjuster blocks are offset with respect to the rails. When the snowmobile encounters bumps, very large forces are exerted on the blocks. Since the adjuster blocks are offset with respect to the rails, these forces induce moments in the bolts that connect the adjuster blocks to the rails of the slide frame. The magnitude of the moment is equal to the product of the force exerted along each rail times the perpendicular lever arm (i.e. the horizontal perpendicular distance from the axis of the guide rail to the center of the adjuster block).

In order to cushion the impact of the lower pivot arm on the adjuster blocks, an elastomeric coating can be place on either the lower pivot arm or on the adjuster blocks themselves. In either case, bulk is added to the mechanism.

Furthermore, with the adjuster blocks mounted to the slide frame as disclosed by Peppel et al., the point of impact of the lower pivot arm on the adjuster blocks is relatively close to the axis of rotation of the lower pivot arm. This results in relatively large loads being exerted on the adjuster blocks as the lower pivot arm collides with the adjuster blocks. In other words, the torque required to stop the lower pivot arm is provided by the force exerted by the adjuster blocks times their vertical lever arm. If the vertical lever arm is relatively small, then the forces exerted on the adjuster blocks must therefore be commensurately large. Since, in the Peppel et al. design, the forces exerted on the adjuster blocks are large, the bolts that connect the adjuster blocks to the slide frame must be larger and of higher grade material in order to withstand the larger stresses imposed on them.

Finally, since the forces developed in the Peppel et al. adjusting mechanism are large, the rear portion of the slide frame is necessarily bulky and well-reinforced as shown in FIGS. 1, 2 and 4 of U.S. Pat. No. 5,692,579. Specifically, the suspension has two side walls extending between the rear wheels and the middle wheels which obstruct the dislodging of snow and ice that are flung into the mechanism by the track. With nowhere to escape, ice and snow have a propensity to become jammed, especially during wet conditions. The ice and snow that can become lodged inside the rear portion of such a tight suspension assembly can amount to at least a few pounds of extraneous weight.

Thus, there is a need in the art for an improved adjustable rear suspension system for a tracked vehicle that overcomes the foregoing deficiencies.

OBJECTS AND STATEMENT OF THE INVENTION

It is thus the object of the present invention to provide an adjustable rear suspension system for a tracked vehicle that is improved with respect to the prior art.

It is another object of the present invention to provide an adjustable rear suspension system for a tracked vehicle wherein certain key components of the suspension are sized and located optimally in order to reduce the overall weight of the suspension.

It is another object of the present invention to provide an adjustable rear suspension system for a tracked vehicle wherein the suspension is open enough to dislodge snow and ice.

As embodied and broadly described herein, the present invention provides a suspension system for mounting an endless track to a chassis of a tracked vehicle, said suspension system comprising: a slide frame for guiding a portion of the endless track, the slide frame having a pair of substantially parallel slide rails, the slide rails defining a longitudinal direction; at least one spring-like member for urging the slide frame away from the chassis; a front suspension arm assembly having an upper end pivotally connected to the chassis and a lower end pivotally connected to the slide frame; a rear suspension arm assembly having an upper end pivotally connected to the chassis and a lower end connected to at least one block capable of limited displacement in the longitudinal direction between a front stopper and a rear stopper; and a lower rocker arm assembly having an upper end connected to at least one block and a lower end pivotally connected to the slide frame.

With such a suspension system, the advantages of having the blocks mounted to the rear suspension arm and the rocker arm assembly as opposed to being mounted directly to the slide frame (as in the prior art) are numerous. First, unlike the prior art suspensions, the blocks are mounted in perfect alignment (as viewed from above) with the slide rails. Unlike the prior art systems, no moment is induced (since the lever arm is effectively nil) and thus the size of the bolts retaining the blocks can be smaller, lighter and cheaper. Second, the blocks are located at a greater vertical distance above the slide rails than in the prior art. This means that the moment induced in the rocker arm is smaller than in the prior art. For the blocks to limit the motion of the rear suspension arm and the rocker arm assembly, the blocks must exert a decelerating torque or "impact torque" (depending on the elasticity of the collision) on the rear suspension arm and the rocker arm assembly. The magnitude of the forces exerted on the blocks when the blocks collide with the stoppers is thus the quotient of torque divided by the vertical lever arm. Obviously, as the lever arm is increased, the magnitude of the forces exerted on the blocks is decreased. Again, by reducing the loads exerted on the blocks, smaller, lighter and cheaper fasteners and associated components can be used. Furthermore, since the forces generated on the adjuster blocks are smaller than in the prior art, the suspension's vertical extensions of the slide rails need not be as strong. The vertical extensions can be provided with obround holes which help to dislodge ice and snow that is delivered into the mechanism by the track.

Preferably, the suspension system for mounting an endless track to a chassis of a tracked vehicle has the lower end of the rear suspension arm connected to two blocks, each block capable of limited displacement in the longitudinal direction between a front stopper and a rear stopper, each block being rotatably mountable to the lower rocker arm assembly and being rectangular-shaped whereby rotation of each block varies the displacement allowable between the front stopper and the rear stopper.

Due to the location of the blocks as shown in FIGS. 1, 4, 5 and 6, such a suspension system permits easy access to the blocks and their associated fasteners so that the blocks can be easily rotated when the user of the tracked vehicles desires to alter the ride characteristics of the suspension system.

Most preferably, the suspension system for mounting an endless track to a chassis of a tracked vehicle the suspension system has guide rails each of which has a pair of integral extensions protruding toward the chassis and to which the front stopper and the rear stopper can be mountable, said front stoppers and said rear stoppers being coated with a resilient material for attenuating loads generated when the blocks collide with said front stoppers or with said rear stoppers.

The use of a resilient coating on the stoppers as opposed to on the adjuster blocks as in the prior art permits the block-stopper mechanism to remain compact. With the resilient coating on all four sides of the adjuster blocks, the amount of space required to allow for the free rotation of the blocks is necessarily larger and hence the whole design becomes less than optimal in terms of compactness.

Other objects and features of the invention will become apparent by reference to the following description and the drawings.

BRIEF DESCRIPTION OF THE DRAWINGS

The invention is further described, by way of example only, with reference to the accompanying drawings wherein.

In the drawings, preferred embodiments of the invention are illustrated by way of examples. It is to be expressly understood that the description and drawings are only for the purpose of illustration and are an aid for understanding. They are not intended to be a definition of the limits of the invention.

DESCRIPTION OF A PREFERRED EMBODIMENT

Figure 1:
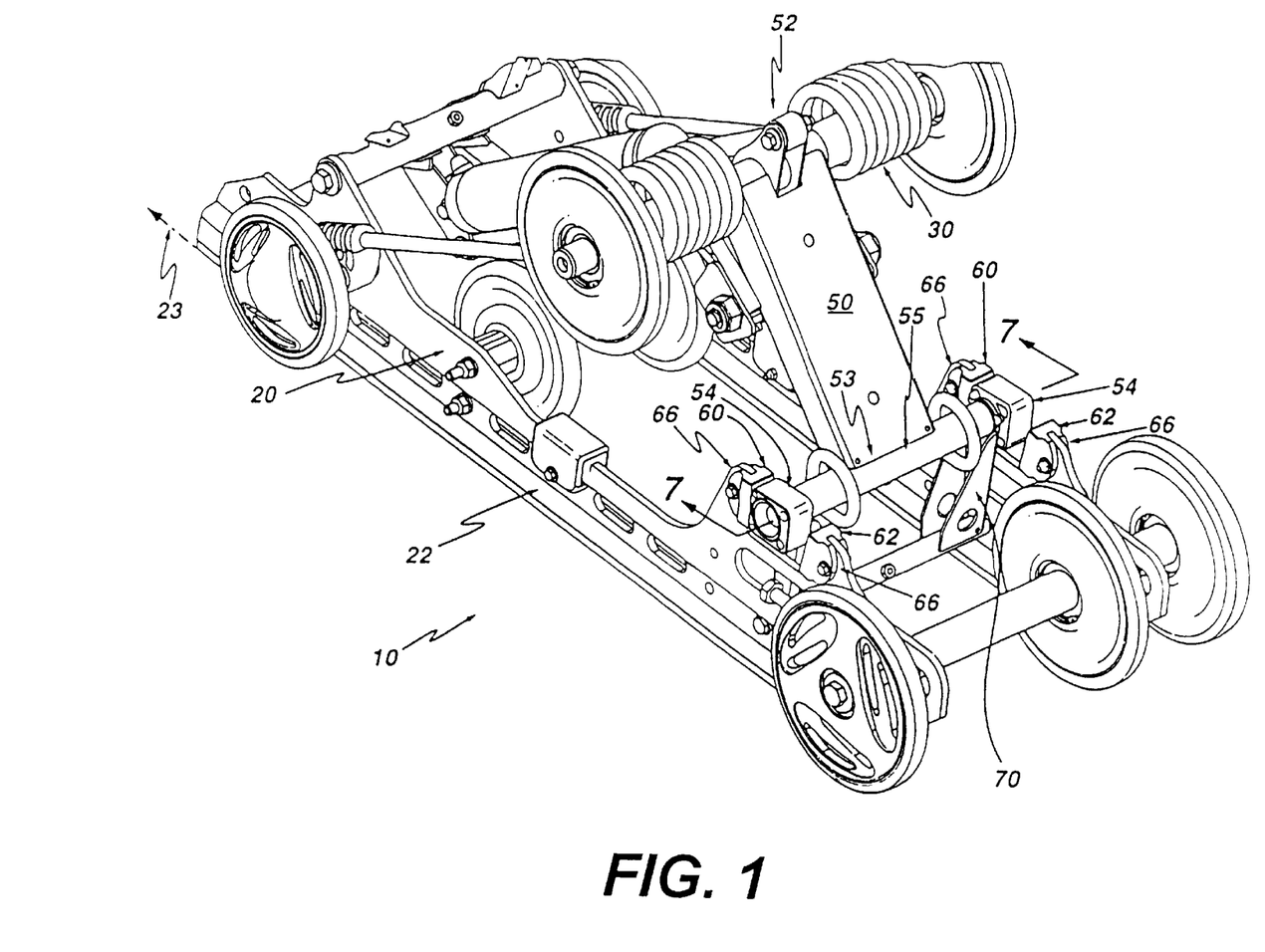
FIG. 1 is a left rear isometric view of an adjustable rear suspension system.
Figure 2:
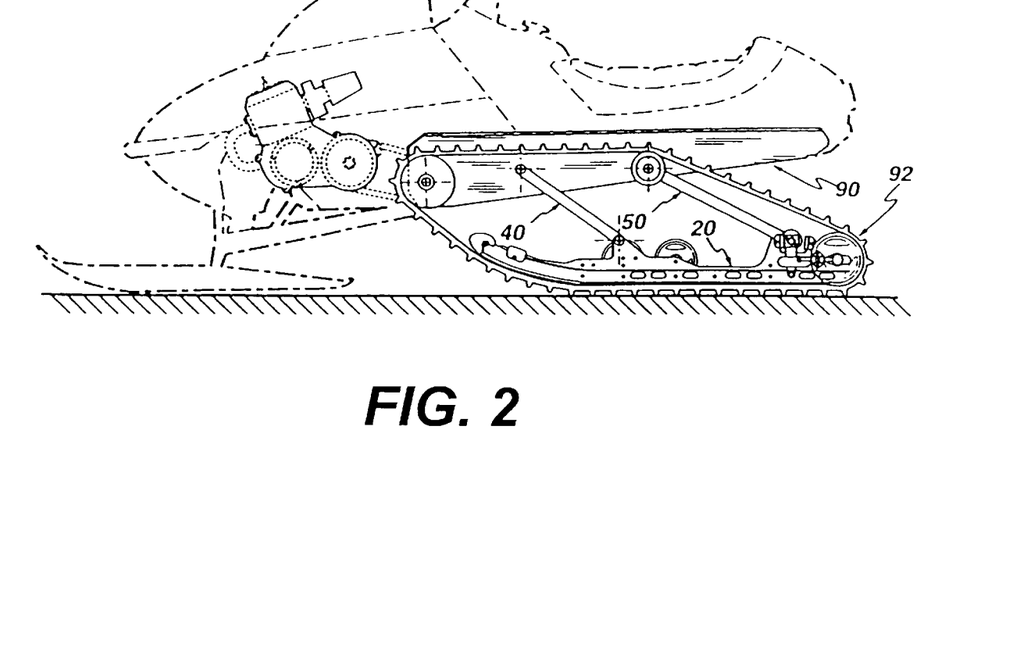
FIG. 2 is a left side elevational view of a rear suspension system mounted to a chassis and an endless track.
Figure 3:
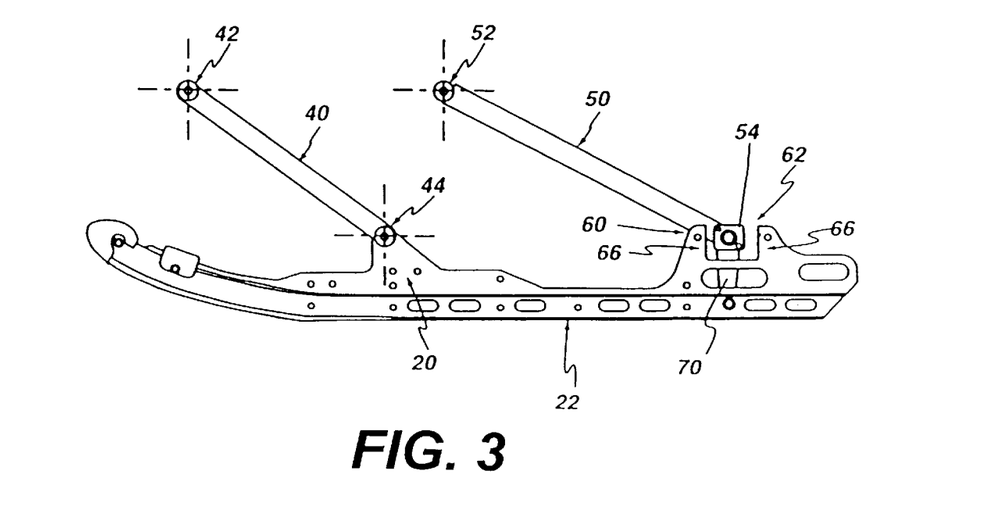
FIG. 3 is a left side elevational view of a slide frame with front and rear suspension arm assemblies connected thereto.

Referring to FIGS. 1, 2 and 3, an adjustable rear suspension system, designated comprehensively by the reference numeral 10, is used for mounting an endless track 92 to a chassis 90. The suspension system 10 comprises a slide frame 20, a front suspension arm assembly 40 and a rear suspension arm assembly 50. The slide frame 20 comprises a pair of parallel slide rails 22 which are maintained at a spaced apart relationship by at least one cross-brace, the slide rails defining a longitudinal direction 23. Also mounted to the slide frame are a plurality of wheels for engagement with the endless track 92. At least one spring-like member 30 is connected to the chassis 90 and the slide frame 20 so as to urge the slide frame 20 downwardly away from the chassis. The spring-like member 30 is preferably a linear, non-linear or torsional metallic spring and is advantageously coupled with a damper or shock absorber to attenuate vibrations.

The front suspension arm assembly 40 has an upper end 42 pivotally mounted to the chassis 90 and a lower end 44 pivotally mounted to the slide frame 20. The rear suspension arm assembly 50 has an upper end 52 pivotally mounted to the chassis 90 and a lower end 53 connected to a pair of blocks 54 via a cross bar 55. The cross bar 55 is connected to a rocker arm assembly 70 which is, in turn, pivotally connected to the slide frame 20.

Figure 7:
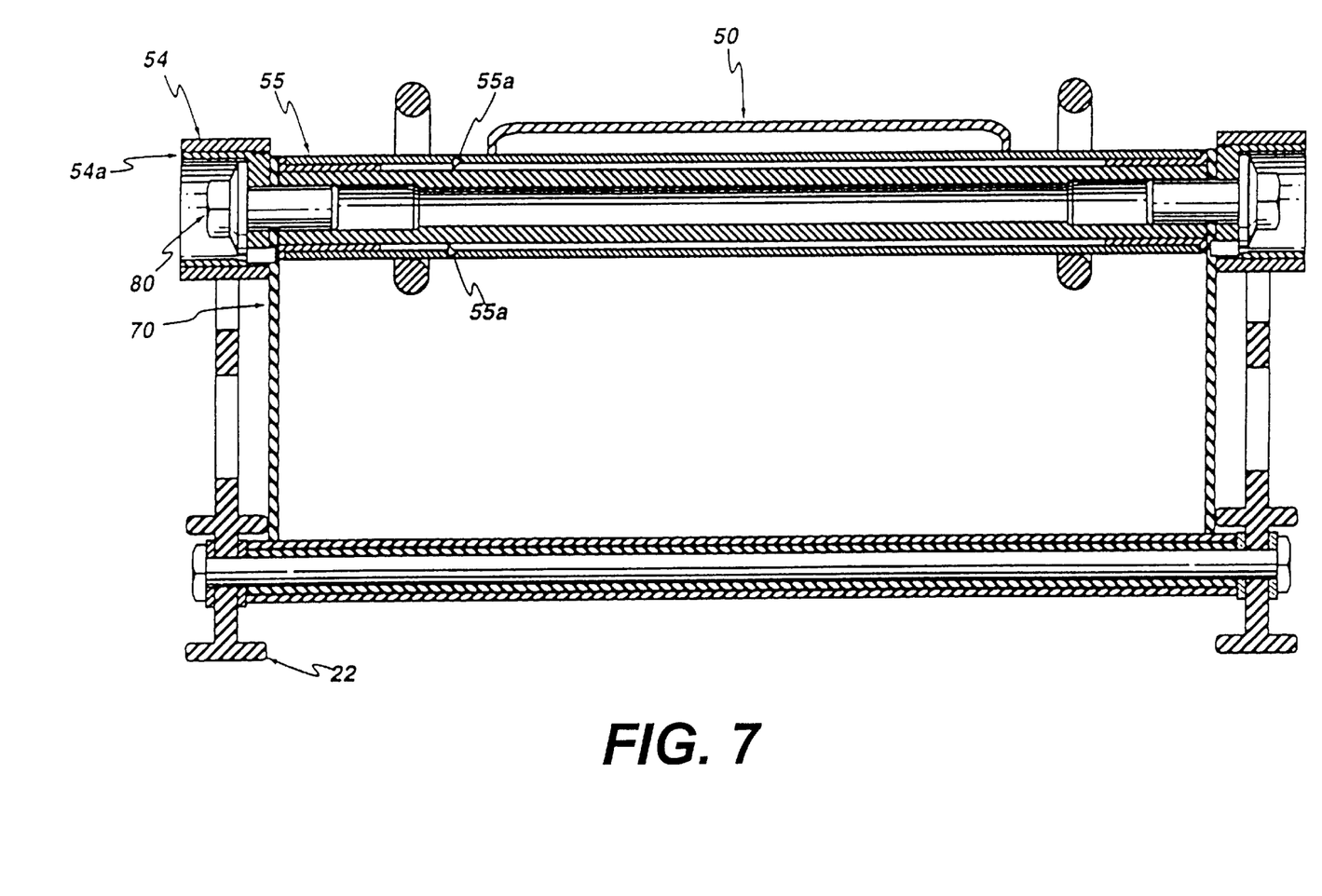
FIG. 7 is a sectional view taken along Section 7—7 in FIG. 1.

The blocks 54 are displaceable between a pair of front stoppers 60 and a pair of rear stoppers 62. The front stoppers 60 and the rear stoppers 62 are preferably mounted to integral extensions 66 of the slide rails 22. The front and rear stoppers 60, 622 could also be mounted to non-integral extension, i.e. brackets that could be fastened to the slide frame. The front and rear stoppers 60, 62 could also be the integral extensions 66 themselves. The blocks are preferably made of an elastomer such as a polyurethane resin. Delrin, nylon, or aluminum could also be used for the blocks. As shown in FIG. 7, the blocks are fastened to the shaft 55a which rotates within the cross bar 55 and to the rocker arm assembly 70 by a pair of block fasteners 80 which are preferably threaded fasteners for easy disassembly and rotation of the blocks.

Figure 4:
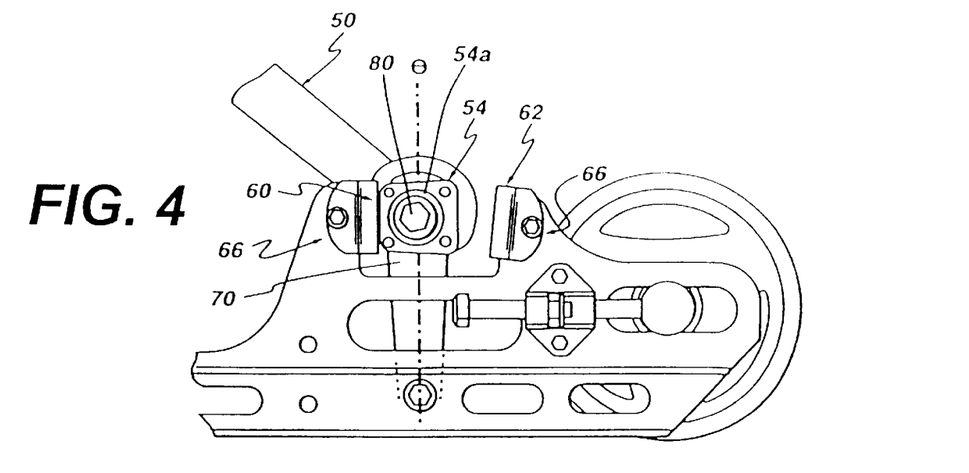
FIG. 4 is a left side elevational view of the left-side block contacting the left front stopper.

In operation, the blocks 54 can adopt the position illustrated in FIG. 4. In this position, the front suspension arm assembly 40 and the rear suspension arm assembly 50 are coupled. In other words, any severe bumps encountered by the rear suspension 10 tend to knock the slide rails 22 of the slide frame 20 backwards such that the blocks 54 press against the front stoppers 60. (It should be noted that small bumps may not cause the blocks to contact the stoppers.) Thus, as the slide rails 22 rise over the bump, the slide rails 22 remain generally horizontal and generally parallel to their undisturbed state (i.e. lying flat on even ground). That the slide rails 22 remains generally horizontal as it rises vertically improves the comfort of the suspension. In some prior art suspensions, the front of the slide frame 20 rises over a bump independently of the rear. This creates an angular acceleration on the rider which is much more uncomfortable than a merely vertical acceleration.

Figure 5:
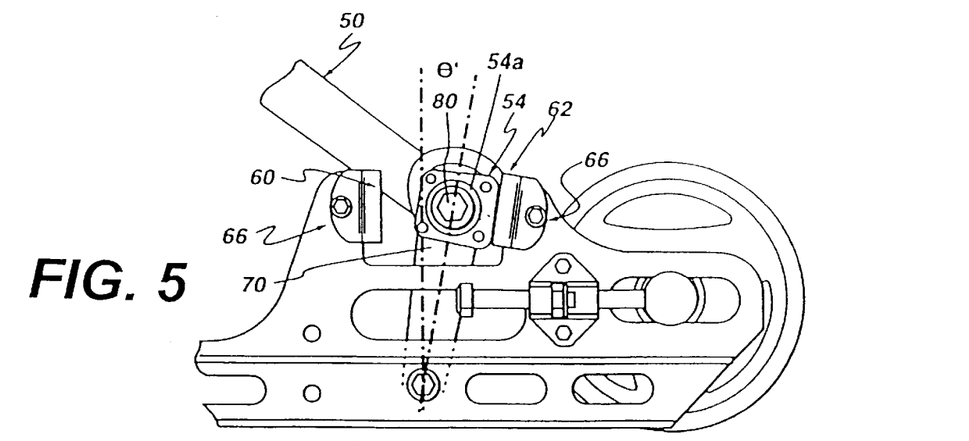
FIG. 5 is a left side elevational view of the left-side block contacting the rear stopper.

As illustrated in FIG. 5, as the front of the slide frame 20 angles upwardly, the blocks 54 disengage the rear stoppers 62 and collide with the front stoppers 60. When the blocks 54 engage the front stoppers 60, the front suspension arm assembly 40 and the rear suspension arm assembly 50 become coupled, thereby raising the rear of the slide frame with the front of the slide frame. The relative rates of elevation of the front and rear of the slide frame 20 are not necessarily identical and call be optimized by varying the geometry of the suspension system.

Figure 6:
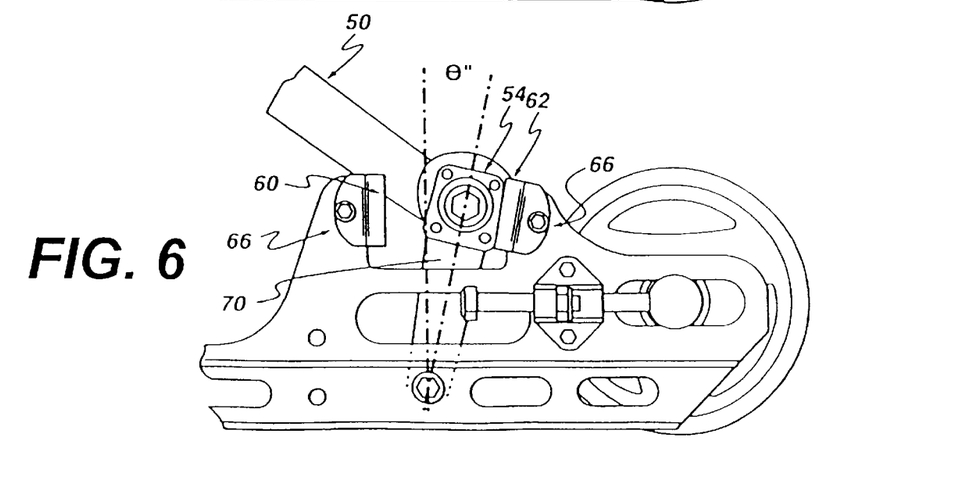
FIG. 6 is a left side elevational view of the left-side block contacting the rear stopper, the block having been rotated ninety degrees with respect to the block as shown in FIG. 4.

The degree of inclination of the slide frame 20 is allowed to achieve before the suspension becomes coupled (i.e. before the rear of the slide frame begins to rise as well) is a function of the range of motion of the blocks 54 between the front stoppers 60 and the rear stoppers 62. This range of motion may be proportional to the distance between the front stoppers 60 and the rear stoppers 62 minus the effective thickness of each of the blocks 54. Assuming that the gap between the front and rear stoppers is an invariable parameter, the range of motion can be varied by adjusting the orientation of the blocks 54. By rotating the blocks 54 by approximately ninety degrees, the thickness of the blocks 54 can be reduced from the thicker dimension as shown in FIG. 5 to the thinner dimension as shown in FIG. 6 thereby increasing the range of uncoupled motion of the blocks 54 within the front and rear stoppers and thereby allowing the rear of the slide frame to rise independently of the front of the slide frame for a greater distance than allowed by the configuration presented by FIG. 5. It should be apparent from FIGS. 4, 5 and 6 that the blocks 54 do not translate purely horizontally but actually travel along an arcuate path defined by the radius of the rocker arm 70. Consequently, the front and rear stoppers are angled so as to engage the blocks 54 in a flat manner. From FIG. 1, it is apparent that since the blocks 54 are easily accessible (i.e. are unobstructed by the wheels or the slide frame), adjustment and maintenance of the blocks 54 are therefore facilitated. Furthermore, since there are only two blocks to rotate and only two possible settings per block (i.e. thick or thin), the adjustment of the range of motion of the suspension system can be done quickly and easily. It should be noted that although the drawings show a block with two settings, it is possible to design a block having practically any number of settings (i.e. depending upon the shape and the block).

In order to attenuate the impact loads generated when the blocks collide with the front and rear stoppers, the front and rear stoppers can be made or coated with a resilient material such as rubber or a polymer. Not only will such a resilient coating attenuate impact loads but coating will also help to reduce wear of the blocks. It is also possible for the blocks to have no coating whatsoever.

Figure 8:
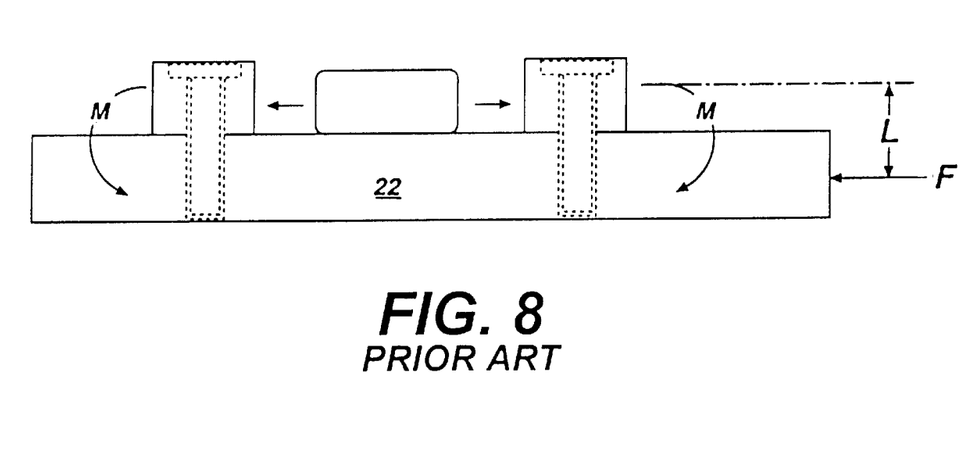
FIG. 8 is a schematic view showing the closest prior art wherein the adjuster blocks are mounted directly to the slide frame in an offset configuration which induces bending moments in the block fasteners when large loads are propagated down the slide rails.
Figure 9:
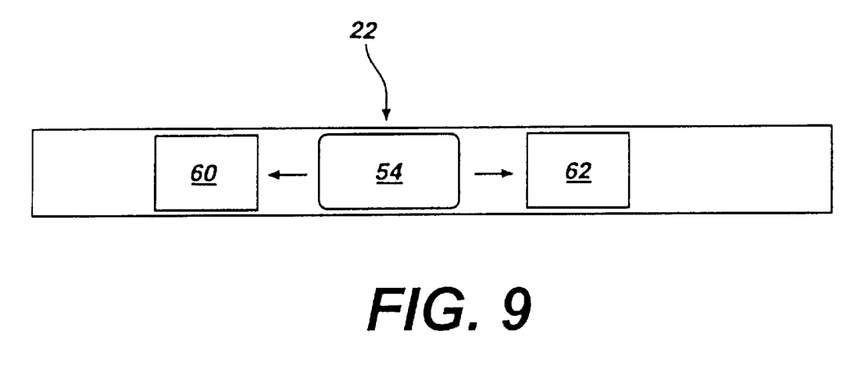
FIG. 9 is a schematic view showing that, in the present invention, the alignment of the blocks with the guide rails eliminates the bending moments in the block fasteners and is thus an improvement over the configuration presented in FIG. 7.

FIG. 8 shows that in the prior art suspension the blocks are offset with respect to the guide rails 22. Forces are transferred longitudinally along each guide rail. As the blocks collide with the stoppers, moments are induced in the block fasteners. The magnitude of these moments, M, are equal to force F times lever arm L. On the other hand, FIG. 9 illustrates that, as in the present invention, if the blocks and stoppers are aligned the guide rails, no moment is induced. Thus, in the present invention, smaller, lighter and cheaper fasteners can be used to retain the blocks than in the prior art suspension.

Figure 10:
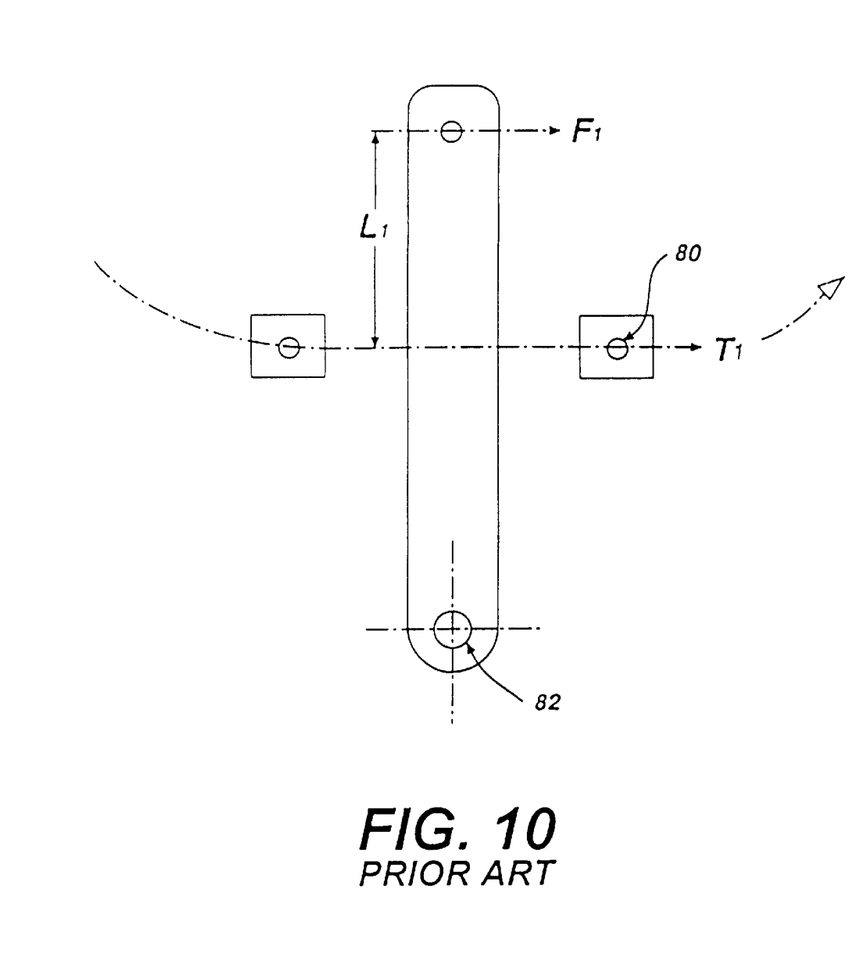
FIG. 10 is a schematic view showing the closest prior art wherein the adjuster blocks are located relatively close to the axis of rotation of the rocker arm thereby producing large shearing forces in the block fasteners when the rocker arm collides with the blocks.
Figure 11:
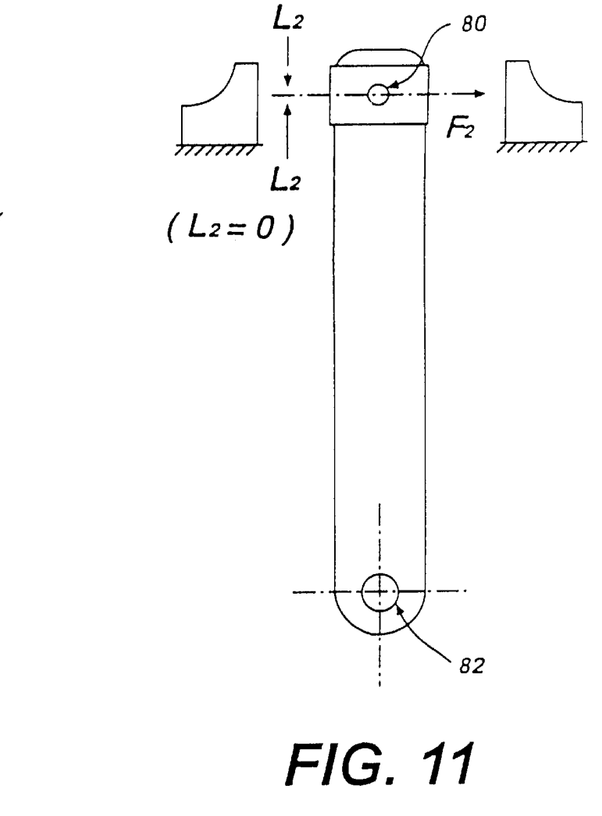
FIG. 11 is a schematic view showing that, in the present invention, the blocks are located at a greater distance from the axis of rotation of the rocker arm thereby producing smaller shearing forces in the block fasteners compared to those of FIG. 9.

FIGS. 10 and 11 illustrate another improvement of the present invention vis-a-vis the prior art. FIG. 10 illustrates that, in the prior art suspension, the block fasteners 80 are at a distance L, from the axis of rotation of the pivot 24 (as shown in FIG. 9 of U.S. Pat. No. 5,692,579). For a given force F, necessary to stop the rocker arm 70, the moment T in the 30 rocker arm is simply equal to $F_1L_1$. FIG. 11 illustrates that, in the present invention, the block fasteners 80 are located a distance $L_2=0$ from the axis of rotation 80 of the block 54. Since the lever arm is zero, then the moment induced by $F_2$ approaches zero. If the force exerted on the block fasteners in the present invention is less than the force exerted on the block fasteners in the prior art suspension, then, in the present invention, the suspension requires smaller, cheaper and lighter fasteners and associated components.

The simple force analyses presented in FIGS. 8–11 clearly illustrate some of the major advantages of having the blocks connected to the rocker arm assembly and the rear suspension arm assembly instead of having the blocks connected in an offset manner to the slide frame.

Figure 12:
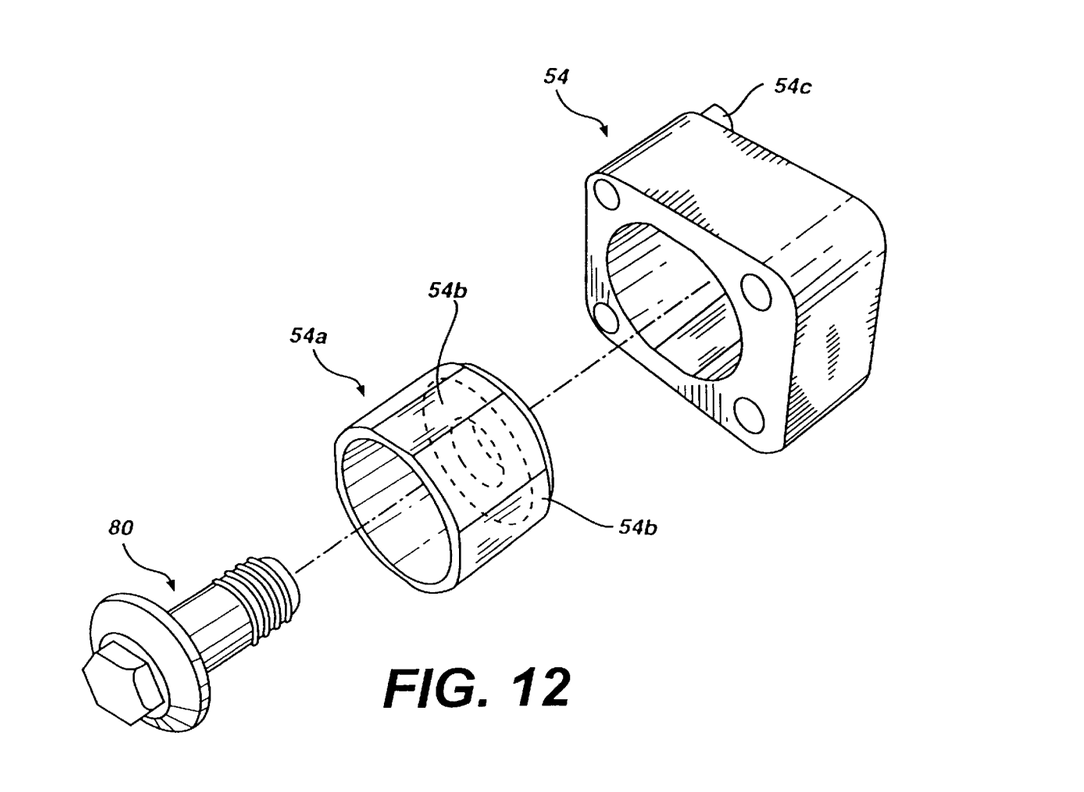
FIG. 12 is an exploded view of an adjuster block and its inner sleeve for use in the present invention.
Figure 13:
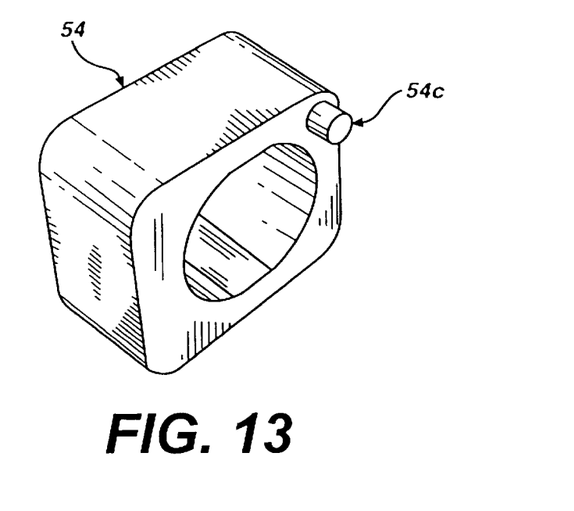
FIG. 13 is a rear perspective view of the adjuster block of FIG. 12.
Figure 14:
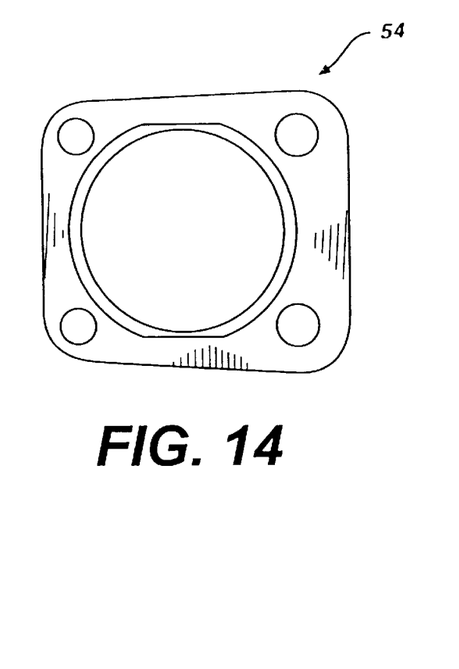
FIG. 14 is a front elevational view of the adjuster block of FIG. 12.

As illustrated in FIGS. 12–14, each adjuster block 54 is preferably provided with a stopper 54c to limit the rotation of the block. The adjuster block 54 has a generally central cavity capable of receiving an inner sleeve 54a, made preferably of aluminum or any similar material. The sleeve 54a preferably has four flat surfaces 54b that create a rotational indexing when fitted inside the block 54. The sleeve 54b, as shown in FIG. 12, can house the fastener 80. When fastener 80 is threadably engaged to the shaft 55a, the inner sleeve 54a is held rigidly in place. The block 54 can thus be rotated around the inner sleeve 54a. Due to the flat surfaces 54b, the block 54 has a tendency to stop when its own flat surfaces are aligned with two of the flat surfaces 54b of the inner sleeve 54a. Thus, since the block 54 tends to stop whenever it encounters a new pair of flat of surfaces, this arrangement is termed "indexed." An indexed mechanism is simpler to use and allows the user to know when the blocks have been correctly set.

While the adjuster blocks of the present invention are preferably operated by using a key or small wrench to rotate the blocks, it should be noted that it is also possible to rotate the blocks by means of a remote mechanism. For instance, the blocks can be linked to a hydraulic system for either adjusting their size or their orientation. Other systems involving pneumatic actuation or push-pull cables could be implemented to allow the rider to adjust the suspension while seated on the snowmobile.

The above description of preferred embodiments should not be interpreted in a limiting manner since other variations, modifications and refinements are possible within the spirit and scope of the present invention. The scope of the invention is defined in the appended claims and their equivalents.

What is claimed is:

1. A suspension system for mounting an endless track to a chassis of a tracked vehicle, said suspension system comprising:

a slide frame having a pair of substantially parallel slide rails, the slide rails defining a longitudinal direction, each of the slide rails forming a first, coplanar vertical extension protruding upward from the slide rail toward the chassis;

a front suspension arm assembly having an upper end pivotally connected to the chassis and a lower end pivotally connected to the slide frame;

a rear suspension arm assembly having an upper end pivotally connected to the chassis and a lower end connected to a block capable of displacement in the longitudinal direction, the displacement of the block being in the plane of one of said slide rails and limited by the first vertical extension of the respective slide rail; and a lower rocker arm assembly having an upper end connected to at least one of the block and the rear suspension arm assembly and a lower end pivotally connected to the slide frame.

2. A suspension system as recited in claim 1 wherein the slide rail further comprises a second vertical extension, and the displacement of the block is limiting along the slide rail between the first vertical extension and the second vertical extension.

3. A suspension system as recited in claim 2 wherein the block is rotatably mounted, whereby rotation of the block varies the displacement allowable between the first vertical extension and the second vertical extension.

4. A suspension system as recited in claim 3 wherein the first vertical extension and the second vertical extension are integrally formed with the slide rail.

5. A suspension system as recited in claim 1 wherein the first vertical extension is coated with a resilient material for attenuating impact loads generated when the block collides with the first vertical extension.

6. A suspension system as recited in claim 2 wherein the first vertical extension and the second vertical extension are coated with a resilient material for attenuating impact loads generated when the block collides with one of the first vertical extension and the second vertical extension.

7. A suspension system as recited in claim 3 wherein the first vertical extension and the second vertical extension are coated with a resilient material for attenuating impact loads generated when the block collides with one of the first vertical extension and the second vertical extension.

8. A suspension system as recited in claim 4 wherein the first vertical extension and the second vertical extension are coated with a resilient material for attenuating impact loads generated when the block collides with one of the first vertical extension and the second vertical extension.

9. A suspension system as recited in claim 1, further comprising a first stopper mounted on the first vertical extension.

10. A suspension system as recited in claim 2, further comprising a first stopper mounted on the first vertical extension, and a second stopper mounted on the second vertical extension.

11. A suspension system as recited in claim 3, further comprising a first stopper mounted on the first vertical extension, and a second stopper mounted on the second vertical extension.

12. A suspension system as recited in claim 4, further comprising a first stopper mounted on the first vertical extension, and a second stopper mounted on the second vertical extension.

13. A suspension system as recited in claim 9, wherein the first stopper is made of a resilient material for attenuating impact loads generated when the block collides with one of the first stopper.

14. A suspension system as recited in claim 10, wherein the first stopper and the second stopper are made of a resilient material for attenuating impact loads generated when the block collides with one of the first stopper and the second stoppers.

15. A suspension system as recited in claim 11, wherein the first stopper and the second stopper are made of a resilient material for attenuating impact loads generated when the block collides with one of the first stopper and the second stoppers.

16. A suspension system as recited in claim 12, wherein the first stopper and the second stopper are made of a resilient material for attenuating impact loads generated when the block collides with one of the first stopper and the second stoppers.

* * * * *